United States Patent Office 3,342,623
Patented Sept. 19, 1967

3,342,623
HEAT-SENSITIVE ELEMENTS FOR USE
IN THERMOGRAPHY
William J. Dulmage, William A. Light, and Sterling S. Sweet, Rochester, N.Y., assignors to Eastman Kodak Company, Rochester, N.Y., a corporation of New Jersey
No Drawing. Filed June 11, 1965, Ser. No. 463,354
The portion of the term of the patent subsequent to July 12, 1983, has been disclaimed
8 Claims. (Cl. 117—36.1)

This is a continuation in part of U.S. application Ser. No. 211,927, filed June 27, 1962, by the present inventors, now U.S. Patent No. 3,260,612, which in turn was a continuation in part of U.S. application Ser. No. 124,037, filed July 14, 1961, by the same inventors, now abandoned.

This invention relates to thermography and particularly to coated sheets useful in thermographic processes.

The parent applications describe certain thermographic processes which employ a heat-sensitive element comprising a sheet coated with a layer of thermoplastic material in a normally nontacky state and having an original tackifying temperature above 50° C. Using thermographic apparatus, image areas of the coating are differentially heated, by means of heat generated by infrared radiation in infrared absorbent image areas of the document with the document in contact with the heat-sensitive coating. Image areas on the heat-sensitive element are heated to the original tackifying temperature of the thermoplastic material causing transition to an essentially amorphous state. The thermoplastic coating useful in our process will remain for a substantial period after such transition in a state having a reduced tackifying temperature substantially below the original tackifying temperature. During this period, at the reduced tackifying temperature, the thermoplastic material in activated image areas is sufficiently viscous and adhesive to permit transfer by pressure from the coated sheet to a receiving sheet. While in unactivated background areas, no transfer occurs.

An object of the present invention is to provide novel heat-sensitive elements for use in the thermographic transfer process briefly described above and described in more detail in the parent applications.

The parent applications disclose two general kinds of heat-sensitive thermoplastic material useful in the process described. One type comprises a nonpolymeric crystalline compound dispersed in an amorphous thermoplastic resin vehicle. At activation temperature the crystalline material melts and blends with the resin vehicle acting as a plasticizer to form an amorphous thermoplastic mixture having a substantially reduced tackifying temperature. A second type, the type used in elements according to the present invention, comprises a highly crystallized polymer which on heating to its original tackifying temperature undergoes transition to amorphous state and thereafter remains for a substantial period in a state having a substantially reduced tackifying temperature. A particular object of the present invention is to provide heat-sensitive elements coated with a film of crystalline thermoplastic resin of this second type.

Accordingly, we provide a flexible sheet having coated on one surface thereof a film of thermoplastic polymeric resin in highly crystallized state such that the first order transition temperature of the crystalline resin is in the range from 50°–200° C., preferably in the range from 70°–150° C. The degree of crystallization in the original coating is such that the original first order transition temperature is at least 50° C. higher than the glass transition temperature of the resin. When the thermoplastic resin coating is heated to this original first order transition temperature, it undergoes transition to amorphous state. In the original crystalline state the resin coating was essentially nontacky and nonviscous and essentially nontransferable by pressure at any temperature below the original first order transition temperature. However, once the resin has been heated and undergoes transition to amorphous state, the resin film becomes viscous and tacky at temperatures down to glass transition temperature and can be transferred by pressure at temperatures substantially below the original tackifying temperature. The resin coatings of our invention have the property of remaining for a substantial period after first order transition temperature in such a transferable state so that a pressure transfer can be made, during this substantial period of time after first order transition, at temperatures substantially below the original first order transition temperature.

This property of remaining transferable (tacky) after activation is called the delay-tack property and is a critical property that distinguishes coatings of the present invention from ordinary thermoplastic resin coatings. In the crystalline polymer type delay-tack resins, the delay-tack property is accounted for by delay of recrystallization at reduced temperatures after the crystalline polymer has undergone transition to amorphous state.

One technique we have used for producing crystalline polymer delay-tack coatings that will not ordinarily recrystallize to the original state after first order transition is to originally crystallize the coating by extraordinary conditions to such an advanced state of crystallization that under ordinary conditions the polymer, after first order transition, will not recrystallize to the original highly crystalline state; for example, during manufacture the polymer film after being coated on the support sheet can be annealed by heat to induce such a state of advanced crystallization. As the degree of crystallization in the resin coating develops and increases, the first order transition temperature increases accordingly. Other crystallization promoting techniques may be useful in this regard, such as solvent coating techniques that leave a resinous coating developed to a very high degree of crystallization. By promoting crystallization in the resin coating to an original state of advanced crystallization which cannot be regained at ordinary room temperatures (below 50° C.) after original transition to amorphous state, the coating, after such transition, remains in a state of no crystallization or a state of limited recrystallization in which the resin can be tackified at a temperature well below the original transition temperature. A preferred technique is to advance the degree of crystallization in the coating to a point where the original first order transition temperature will be at least 15° C., and preferably 20°–30° C. higher than the tackifying temperature of the coating in the highest state of crystallization that can be regained by recrystallization at room temperatures. This preferred technique for providing the delay-tack property may be employed with coatings of a variety of polymers, even those that have inherently fast recrystallization properties.

Some crystalline polymer resins have, inherently, such a slow rate of recrystallization that for a considerable period after first order transition such a polymer remains amorphous, or at least remains so slightly recrystallized that for quite some time it can be transferred at temperatures well below the original tackifying temperature, even though it might gradually recrystallize completely to the original state.

To permit contact of the resin coating directly with the original document to be copied during the thermographic heating step, our resin coating has a melt viscosity at the original first order transition temperature of at least 100 poises and preferably more than 200 poises. After transition, while in amorphous state, the polymer will remain viscous and tacky to some extent at temperatures down to the glass transition temperature. In the transfer step of our process we prefer to use a nominal transfer temperature at least 10° below the original first order transition temperature, preferably 15 or more degrees below, to reduce the chance of accidental activation of un-activated areas on the coated sheet during transfer. At transfer temperature, the resin must have viscosity low enough to permit transfer by pressure. By using very high transfer pressure, transfers can be made with resins having melt viscosity as high as $10^5$ poises by rolling the activated element at slow rates of advance through the nip of high pressure steel rolls to induce transfer of such viscous material. However, for most practical purposes we prefer to transfer at a viscosity below 50,000 poises using pressure as necessary to induce transfer. A transfer temperature is selected at least 10° C. below the original transition temperature and sufficiently high so that the resin in its transferable state will have a suitable transfer viscosity in the range from about 100 to about 50,000 poises.

Transfer characteristics are affected by film thickness and we prefer to coat from 0.05 to about 0.3 gram of thermoplastic resin coating material per square foot of surface area when not using transfer regulating means as disclosed in the parent applications. At film thicknesses above the specified maximum, the amount of material transferred is excessive and produces a very messy copy. With coatings near the lower limit of thickness, the density of the transferred image weakens, even with heavily colored resins.

In the thermographic process for which the heat-sensitive elements of this invention are designed, the element must be able to transmit infrared radiation in quantities sufficient to heat image areas on the document to activation temperature without absorbing enough of the incident radiation to directly heat the element to activation temperature. Most of the resins and paper supports have been sufficiently non-absorptive of infrared radiation to present no serious problem in this regard. We did find however that in selection of suitable colorants for the resin transfer material, infrared absorption became critical. Since the purpose of the transfer is to produce a printed image, it is desirable to produce a black or near black color for most purposes. Most black pigments and dyes were too infrared absorptive to be useful. In searching for suitable dyes, we found with the infrared source lamps used in most infrared thermographic machines, the peak radiation is in the range from 1.0 to 1.5 m$\mu$ and we found that a dye is entirely unsuitable as a colorant for our heat-sensitive coating if the element, with the dye incorporated, absorbs more than 20% of incident radiation in the 1.0 to 1.5 m$\mu$ range. We prefer to employ a dye or dye mixture of suitable color that absorbs less than 5 percent of incident radiation in this peak range.

The resin coat in its original high state of crystallization must have an original first order transition temperature sufficiently high to avoid accidental activation by ambient temperature, yet not so high that destructive temperatures are needed for activation. For these reasons we have specified a heat-sensitive coating having an original first order transition temperature in the range from 50°–200° C. For use in most commercial thermographic apparatus presently in use, the original first order transition temperature for activation of the heat-sensitive coat should be above 80° C. and preferably below 150° C.

From the foregoing discussion it will be appreciated that critical properties governing the function of our heat-sensitive coatings in the thermographic transfer processes are entirely physical. The functions depend on physical response to heat and pressure by the selected thermoplastic resin in its several states of crystalline and non-crystalline structure.

While it is possible to find particular thermoplastic resins having all of the necessary properties within the defined critical ranges within several classes of crystalline polymeric thermoplastic resin, we have found some preferred resins for making our coatings. Polyolefins, especially polypentenes and polybutenes, having highly regular chain arrangements (isotactic) can be developed to highly crystalline state by heat annealing. Those having intrinsic viscosities near 0.25 (measured in dilute solution in phenol:chlorobenzene::1:1 solvent).

Example I

A solution of 8.5 grams of isotactic poly(butene-1) having inherent viscosity of 0.24, in 50 grams of methylene chloride containing 0.5 gram of Oil Black BT dye was prepared and then coated at a thickness corresponding to about 0.3 gram of solid constituents per square foot on a strip of transparent greaseproof paper. Solvent was removed from the coating by drying and the element was annealed at 75° C. for 18 hours. After annealing, the first order transition temperature of the coating was 96° C. The coated and annealed element was placed with the coated side against the printed characters of an original and the assembly was exposed to infrared radiation through the support side of the coated element. The infrared source was a standard 1,000 watt tubular General Electric infrared bulb with an electrical reflector operated under overload conditions, for example from about 800 to about 1460 watts at a distance about ½-inch from the exposed surface. Infrared radiation absorbed by printed characters of the original generated heat causing opposed areas of the heat-sensitive coating to undergo first order transition, thereby activating areas corresponding to the printed characters on the original. The infrared exposure heating step was done in a Thermofax Secretary thermographic machine. After exposure, the original was separated from the activated heat-sensitive element, which was then placed with its coated surface aginst a sheet or office stationery, and the two sheets in this arrangement were pressed at room temperature (15° C.–20° C.) between pressure rollers, exerting 30 pounds per linear inch of roller length and having a roller diameter of 2½-inches. Thermaplastic material was transferred from the coating to the receiving sheet to produce a good colored image reproduction of the original on the copy paper.

Another useful class of resins having properties especially useful for making crystalline polymer type delay-tack coatings is the group of linear polyesters obtained by condensation of aliphatic and cycloaliphatic dicarboxylic acids with aliphatic and cycloaliphatic diols and having molecular weights in the range corresponding to intrinsic viscosities from about 0.25 to about 0.70. Examples of such polyesters are poly(tetramethylene carbonate), poly(pentamethylene carbonate), poly(2,2-dimethyltrimethylene succinate), poly(1,4-cyclohexanedimethylene succinate), poly(1,4-cyclohexanedimethylene adipate), poly(monomethylene succinate), poly(pentamethylene terephthalate), poly(ethylene 1,4-cyclohexane dicarboxylate), copoly(1,4-cyclohexanedimethylene adipateazelate[3:1]), and the like.

Further description of polyesters of this class and a preferred method for their synthesis is described in U.S. patent application Ser. No. 364,772 filed May 4, 1964, by T. M. Laakso.

Example II

A 10 percent solution of poly(2,2-dimethyltrimethylene succinate) having inherent viscosity of 0.34 was prepared using a 4:1 solvent mixture of acetone and methylene chloride. Five percent by weight, based on the polymer component weight, of Azo Oil Blue Black B dye was added to the solution and the composition was coated on a parchment paper support at a rate of 0.3 gram of resin per square foot. The coating was dried, then annealed by heating at 70° C. for 6 hours. After annealing, the coating had a first order transition temperature of about 79° C. The finished heat-sensitive element was activated in image areas by contact with an infrared-exposed original document as described in Example I and then was pressed between pressure rollers with the coated side of the activated element in contact with a sheet of paper having a hydrophilic surface, making a lithographic plate having hydrophilic background with an oleophilic printed image. This plate, after being swabbed with a conventional litho plate conditioning solution, was used as a lithographic master to produce about 150 copies on a conventional offset printing press.

*Example III*

Seven grams of poly(1,4-cyclohexanedimethylene succinate) having inherent viscosity of 0.40 was dissolved in 30 grams of ethylene chloride containing 1 gram of Azo Oil Blue Black B dye (Allied Chemical and Dye Corp.). The solution was heated to 60° C. and coated by doctor blade on glassine paper at a rate of 0.3 gram of resin per square foot. The coating was dried and then the element was annealed at 100° C. for 40 minutes. After annealing, the original first order transition temperature of the coating was about 120° C. The coated element was activated by the infrared-exposure heating method described in Example I and the activated element was pressed, at room temperature, against a receiving sheet of ordinary stationery through pressure rollers exerting 30 pounds per linear inch pressure. By repeating the transfer step several times, multiple copies of good quality were transferred from the once-exposed matrix.

*Example IV*

A composition of 9.0 gram copoly(1,4-cyclohexanedimethylene adipate-azelate[3:1]) having inherent viscosity of 0.42, 1.0 gram Iosol Black dye in 30 grams ethylene chloride was coated on greaseproof paper and dried at 80° C. The dry weight of the coating was 0.3 gram/foot². After drying, the original first order transition temperature of the coating was 92° C. The element was activated as in Example I and transfer copies were made using transfer rolls at room temperatures. The activated areas remained transferable at room temperature for several minutes.

It will be understood that variations and modifications may be made within the scope of the invention as described above and as defined in the following claims.

We claim:

1. A coated thermographic element comprising a flexible supporting sheet and coated thereon an outer layer of thermoplastic polymeric resin in highly crystallized state having an original first order transition temperature in the range from 50°–200° C. and at least 50° C. above the glass transition temperature of the resin film, said resin film in said original crystallized state being essentially nontacky and nonviscous and essentially nontransferable by pressure at temperatures below said original first order transition temperature, said resin film having melt viscosity at said original first order transition temperature greater than 100 poises and having the property of remaining, for a period of at least one minute after first order transition, in a transferable state in which resin can be transferred from the coated layer by pressure at a transfer temperature at least 15° C. below said original first order transition temperature, the melt viscosity of the resin film in said transferable state at said transfer temperature being in the range from 100 to 50,000 poises, the thickness of said resin film being in the range from about 0.05 to about 0.3 gram per square foot, said layer having incorporated therein a compatible colorant, said entire element being nonabsorbtive of infrared radiation to the extent that less than 20 percent of incident radiation in the range from 1.0 to 1.5 m$\mu$ is absorbed by the element, the polymeric thermoplastic resin of such layer being a member selected from the group consisting of linear condensation polyesters of aliphatic and cycloaliphatic diols with aliphatic and cycloaliphatic dicarboxylic acids having molecular weights corresponding to intrinsic viscosity in te range from about 0.25 to about 0.70.

2. A coated thermographic element as defined in claim 1 wherein said linear condensation polyester is copoly (1,4-cyclohexanedimethylene adipate-azelate[3:1]).

3. A coated thermographic element comprising a flexible supporting sheet and coated thereon an outer layer of thermoplastic polymer resin crystallized to an original state of crystallization in which the coated layer has an original first order transition temperature at least 50° C. higher than the glass transition temperature of the resin and in the range from 50°–200° C., the resin in said original state being nontransferable by pressure at temperatures below said original transition temperature and crystallized to a degree higher than the highest state of crystallization that can be attained by recrystallization of the resin in said layer at temperatures below 50° C. after such original transition, said resin being one having melt viscosity above 100 poises at said original first order transition temperature and being sufficiently viscous and tacky in amorphous state at a transfer temperature at least 15° C. below said original transition temperature to be transferable by pressure at said transfer temperature, said layer being colored by a dye absorptive of less than 20 percent of incident radiation in the range from 1.0 to 1.5 m$\mu$.

4. A heat-sensitive element as defined in claim 3, the original transition temperature of said resin being at least 15° C. higher than the lowest transfer temperature at which the resin, after said original first order transition and after complete recrystallization at temperatures below 50° C., can be transferred by pressure.

5. A coated thermographic element as defined in claim 3 wherein said resin is polybutene-1.

6. A coated thermographic element as defined in claim 3, the thickness of said resin film being in the range from about 0.05 to 0.3 gram per square foot.

7. A coated thermographic element as defined in claim 3, said layer being colored by a dye absorptive of less than 5 percent of incident radiation in the range from 1.0 to 1.5 m$\mu$.

8. A coated thermographic element as defined in claim 3, said resin being an isotactic polyolefin having intrinsic viscosity of about 0.25.

References Cited

UNITED STATES PATENTS

| 2,462,029 | 2/1949 | Perry | 117—122 |
|---|---|---|---|
| 2,653,880 | 8/1953 | Hendricks | 117—122 |
| 2,678,284 | 5/1954 | Holt | 117—122 |
| 3,060,023 | 10/1962 | Burg | 101—149.5 |
| 3,057,824 | 10/1962 | Bras et al. | 260—75 |
| 3,117,950 | 1/1964 | Kibler et al. | 260—75 |
| 3,243,413 | 3/1966 | Bell et al. | 117—155 |
| 3,260,612 | 7/1966 | Dulmage et al. | 117—36.1 X |
| 3,261,023 | 7/1966 | Light et al. | 117—36.1 X |

MURRAY KATZ, *Primary Examiner.*